J. KLAR.
Corn-Planters.

No. 145,952.  Patented Dec. 30, 1873.

Witnesses
G. B. Towles.
W. Burris

Inventor
Joseph Klar
per R.H.A. Lacey
attorneys

UNITED STATES PATENT OFFICE.

JOSEPH KLAR, OF SHELBYVILLE, ILLINOIS.

IMPROVEMENT IN CORN-PLANTERS.

Specification forming part of Letters Patent No. 145,952, dated December 30, 1873; application filed October 25, 1873.

*To all whom it may concern:*

Be it known that I, JOSEPH KLAR, of Shelbyville, in the county of Shelby and State of Illinois, have invented certain new and useful Improvements in Corn-Planter; and I do hereby declare the following to be a full, clear, and exact description of the invention, such as will enable others skilled in the art to which it pertains to make and use it, reference being had to the accompanying drawings, which form part of this specification.

This invention relates to improvements on Letters Patent granted to G. D. Haworth, bearing date February 22, 1870; and consists, first, in the application of a guard or protector to the bar E in position to prevent the check-row cord and the various devices operated thereby (for actuating the valves) from being thrown out of gear or otherwise impeded in their action by reason of corn-stalks or other trash or rubbish getting between or against the same in the operation of the machine; secondly, the invention relates to the application of a socket-fender, through which the check-row cord passes, the object of which is to protect such cord from being choked when passing round the pulleys F or thrown off the same, and to protect the same from wear by coming in contact with the apparatus, and to the application of a horn to the bearings or supports G, for the purpose of guiding the check-row cord when turning; but that my invention may be fully understood, I will proceed to describe the same in detail by aid of the accompanying drawings.

Figure 3:
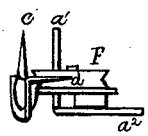
Figure 2:
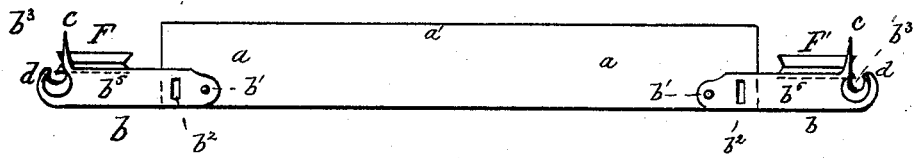
Figure 1:
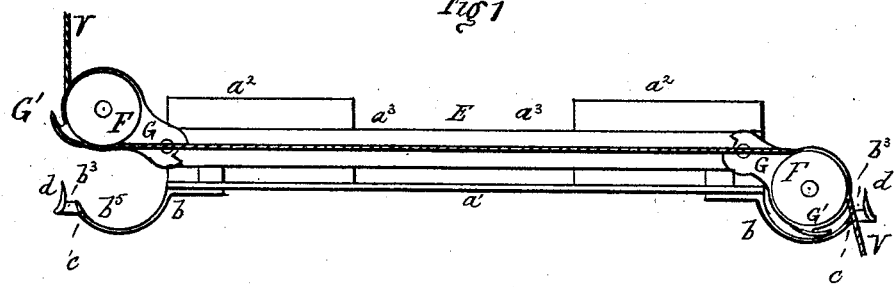

Figure 1 represents a plan, Fig. 2 a front view, and Fig. 3 an end view, of a bar, E, such as described in the specification of patent before referred to with my improvements applied thereto.

$a$ $a$ represent my improved guard, which, by preference, is composed of wood, the front and upper portion $a^1$ extending the whole width, or nearly so, of the bar E, and having portions $a^2$ $a^2$ extending under the bar E, at right angles to the part $a^1$, the space $a^3$ being left for the reception of the tongue and portions of the framing, which will sufficiently protect the working devices at that part.

It will thus be seen that when the machine is in operation corn-stalks and other trash and substances liable to choke or impede the working devices will come against the one or other of the portions $a^1$ or $a^2$ $a^2$, and will be driven away, thereby preventing any choking of the same.

$b$ $b$ represent a pair of socket-fenders applied at either end of the machine, so that in whichever direction the machine is traveling one or other is always in position for use, such fenders being used alternately. Each fender $b$ is pivoted, at $b^1$, to the guard $a$, and is provided with a slot, $b^2$, for the passage of a screw-bolt, for the purpose of regulating the position of the said fenders in relation to the pulleys F, and at their outer ends the fenders $b$ are provided with a semi-circular gutter or channel, $b^3$, for the passage of the check-rope. These channels $b^3$, on their front sides are bell mounted, in order that friction on the rope may be avoided as far as possible.

The portion of the fenders $b$ in which the hole or socket for the pivot $b^1$ and the slot $b^2$ is formed is constructed with a flat bearing-surface, while the portion $b^5$ is curved, so as to allow of the free action of the pulleys F.

$c$ $d$ are horns or projections formed on either side of the gutters or channels $b^3$, and projecting at right angles to one another in position to serve as fenders for the pulleys F, as well as guides for the rope V. G' is a horn applied to each of the bearings or supports G of the pulleys F, for the purpose of guiding the rope V into the grooves of the pulleys F after the machine has been turned around, to make a return trip, instead of walking up to the machine and placing the rope in the groove or spending time endeavoring to throw the rope in the groove of the pulley.

Having thus described my invention, what I claim, and desire to secure by Letters Patent, is—

1. In corn-planters of the description re-referred to, the guard $a\ a^1\ a^2$, in combination with the pulleys F, pivoted bearings G, and rope V, as specified.

2. The pivoted support G, horn G', and pulley F, in combination with the stationary guide $b$, horns $c\ d$, and channel $b^3$, as specified.

In testimony that I claim the foregoing I have hereunto set my hand this 21st day of October, 1873.

JOSEPH KLAR.

Witnesses:
 E. H. COOK,
 G. W. FOUKE.